United States Patent
Lee et al.

(10) Patent No.: US 10,425,866 B2
(45) Date of Patent: *Sep. 24, 2019

(54) METHOD FOR ESTABLISHING/RELEASING A MAC (MEDIUM ACCESS CONTROL) ENTITY IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,532

(22) Filed: Jan. 23, 2019

(65) Prior Publication Data

US 2019/0174371 A1    Jun. 6, 2019

Related U.S. Application Data

(63) Continuation of application No. 14/778,283, filed as application No. PCT/KR2014/002724 on Mar. 31, 2014.

(Continued)

(51) Int. Cl.
*H04W 36/00* (2009.01)
*H04W 76/34* (2018.01)
(Continued)

(52) U.S. Cl.
CPC ....... *H04W 36/0072* (2013.01); *H04W 36/04* (2013.01); *H04W 76/34* (2018.02); *H04W 16/32* (2013.01)

(58) Field of Classification Search
None
See application file for complete search history.

(56) References Cited

U.S. PATENT DOCUMENTS

| | | | |
|---|---|---|---|
| 2007/0265875 A1 | 11/2007 | Jiang et al. | |
| 2008/0045224 A1 | 2/2008 | Lu et al. | |
| 2010/0130205 A1 | 5/2010 | Jung et al. | |
| 2011/0275378 A1 | 11/2011 | Kwon et al. | |
| 2012/0120920 A1 | 5/2012 | Zhang et al. | |
| 2012/0147869 A1 | 6/2012 | Chhatriwala et al. | |

(Continued)

FOREIGN PATENT DOCUMENTS

| | | |
|---|---|---|
| CN | 102959892 A | 3/2013 |
| JP | 2007503155 A | 2/2007 |

(Continued)

OTHER PUBLICATIONS

3GPP TS 36.321 V10.7.0 (Dec. 2012) "3rd Generation Partnership Project; Technical Specification Group Radio Access Network; Evolved Universal Terrestrial Radio Access (E-UTRA); Medium Access Control (MAC) protocol specification (Release 10)", XP050691623.

(Continued)

*Primary Examiner* — Chi H Pham
*Assistant Examiner* — Raul Rivas
(74) *Attorney, Agent, or Firm* — Dentons US LLP

(57) ABSTRACT

In a wireless communication system, a user equipment, already configured with a first medium access control (MAC) entity for a master cell group (MCG) associated with a master base station, capable of configuring a secondary cell group (SCG) associated with a secondary base station based on a radio resource control (RRC) message received from the master base station. The user equipment can configure a second MAC entity for the newly configured SCG. Through a second RRC message from the master base station, the user equipment can then add a new SCG cell to (Continued)

the SCG, where the second MAC entity is commonly configured for one or more secondary SCG cells belonging to the SCG.

2 Claims, 14 Drawing Sheets

Related U.S. Application Data

(60) Provisional application No. 61/808,636, filed on Apr. 5, 2013.

(51) Int. Cl.
*H04W 36/04* (2009.01)
*H04W 16/32* (2009.01)

(56) References Cited

U.S. PATENT DOCUMENTS

2012/0281548 A1 11/2012 Lin et al.
2012/0314648 A1 12/2012 Zhang et al.

FOREIGN PATENT DOCUMENTS

| WO | 2012006120 A1 | 1/2012 |
| WO | 2013010418 A1 | 1/2013 |
| WO | 2013013412 A1 | 1/2013 |

OTHER PUBLICATIONS

CMCC: "Discussion on dual connectivity for R12 small cell", 3GPP TSG RAN WG2 #81bis Meeting, R2-131020, Apr. 15-19, 2013.
Nokia Corporation, Nokia Siemens Networks: "C-plane alternatives for dual-connectivity", 3GPP TSG-RAN WG2 Meeting #81bis, R2-131108, Apr. 15-19, 2013.

( a ) Control-Plane Protocol Stack ( b ) User-Plane Protocol Stack (a) When the UE connected to MeNB moves to the area under SeNB1

(b) When the UE connected to MeNB moves from the area under SeNB1 to the area under SeNB2

(c) When the UE connected to MeNB moves out of the area under SeNB2

(a) C-Plane connectivity of eNBs involved in dual connectivity (b) U-Plane connectivity of eNBs involved in dual connectivity

METHOD FOR ESTABLISHING/RELEASING A MAC (MEDIUM ACCESS CONTROL) ENTITY IN A WIRELESS COMMUNICATION SYSTEM AND A DEVICE THEREFOR

This application is a continuation of U.S. patent application Ser. No. 14/778,283, filed Sep. 18, 2015, which is a National Stage Entry of International Application No. PCT/KR2014/002724, filed Mar. 31, 2014, which claims the benefit of priority to U.S. Provisional Application No. 61/808,636, filed Apr. 5, 2013, all of which are incorporated by reference in their entirety for all purposes as if fully set forth herein.

TECHNICAL FIELD

The present invention relates to a wireless communication system and, more particularly, to a method for establishing/releasing a MAC entity and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for establishing/releasing a MAC entity in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; communicating with a first base station (BS) on a first type cell, wherein the UE has a first MAC entity for the first type cell; establishing a second MAC entity for a second type cell, when the UE starts to communicate with a second BS while maintaining communication with the first BS; and releasing the second MAC entity for the second type cell, when the UE stops to communicate with the second BS while maintaining communication with the first BS.

In another aspect of the present invention, provided herein is a UE (User Equipment) in the wireless communication system, the UE comprising: an RF (Radio Frequency) module; and a processor to control the RF module, wherein the processor is configured to communicate with a first base station (BS) on a first type cell, wherein the UE has a first MAC entity for the first type cell, to establish a second MAC entity for a second type cell, when the UE starts to communicate with a second BS while maintaining communication with the first BS, and to release the second MAC entity for the second type cell, when the UE stops to communicate with the second BS while maintaining communication with the first BS.

Preferably, when the second type cell of the second BS is added to the UE, the UE starts to communicate with the second BS.

Preferably, when a radio bearer is established on the second type cell of the second BS, the UE starts to communicate with the second BS.

Preferably, when the second type cell of the second BS is removed from the UE, the UE stops to communicate with the second BS.

Preferably, when only one of radio bearers in the second type cell of the second BS releases, the UE stops to communicate with the second BS.

Preferably, the method further comprises receiving configuration information including radio resource configuration of the second type cell to be added to or released from the UE.

Preferably, the configuration information is received through a RRC signaling message.

Preferably, the configuration information is indicated by the first base station on a first type cell or a second base station on a second type cell.

Advantageous Effects

According to the present invention, establishing/releasing a MAC entity can be efficiently performed in a wireless communication system. Specifically, establishing/releasing a MAC entity can be efficiently performed in the cell change procedure.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
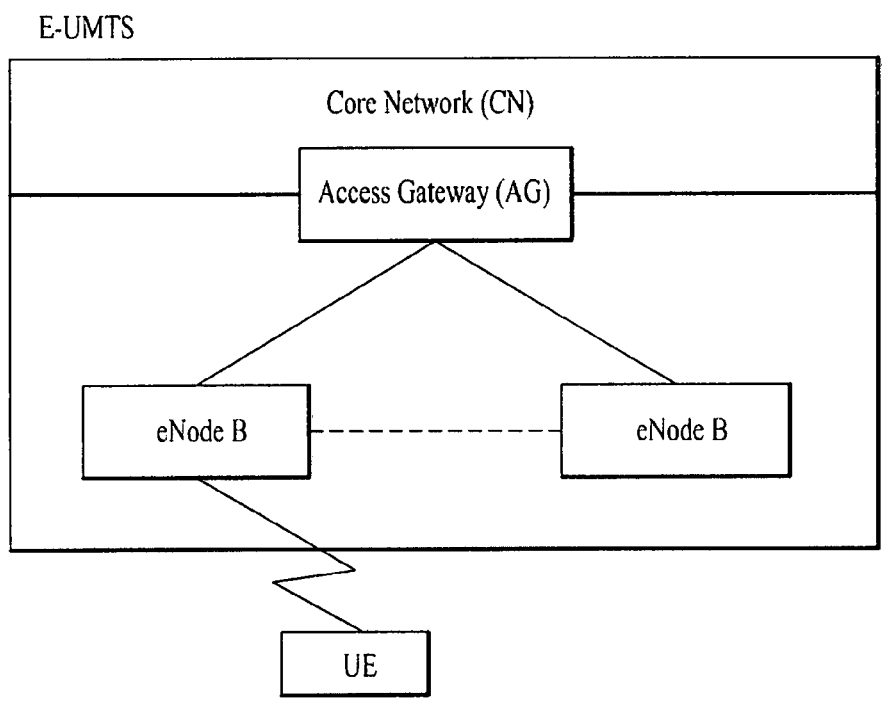
FIG. 1 is a diagram showing a network structure of an Evolved Universal Mobile Telecommunications System (E-UMTS) as an example of a wireless communication system.
Figure 2A:
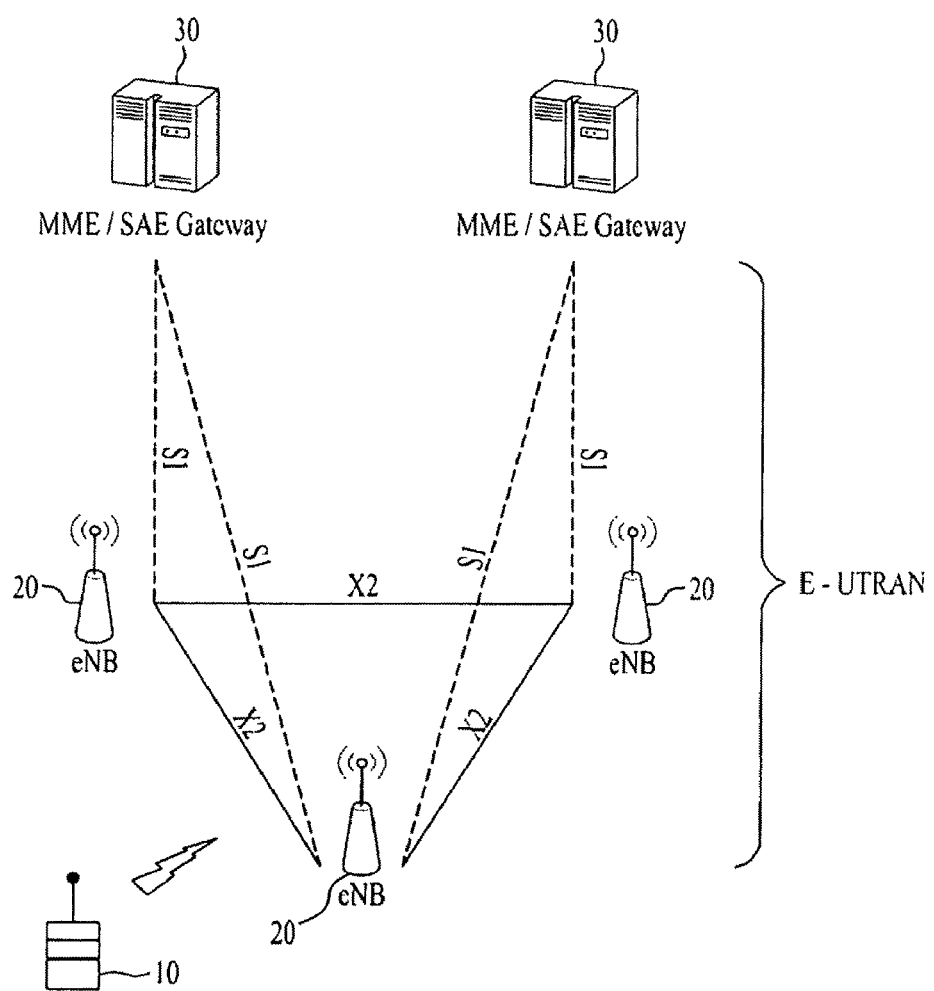
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
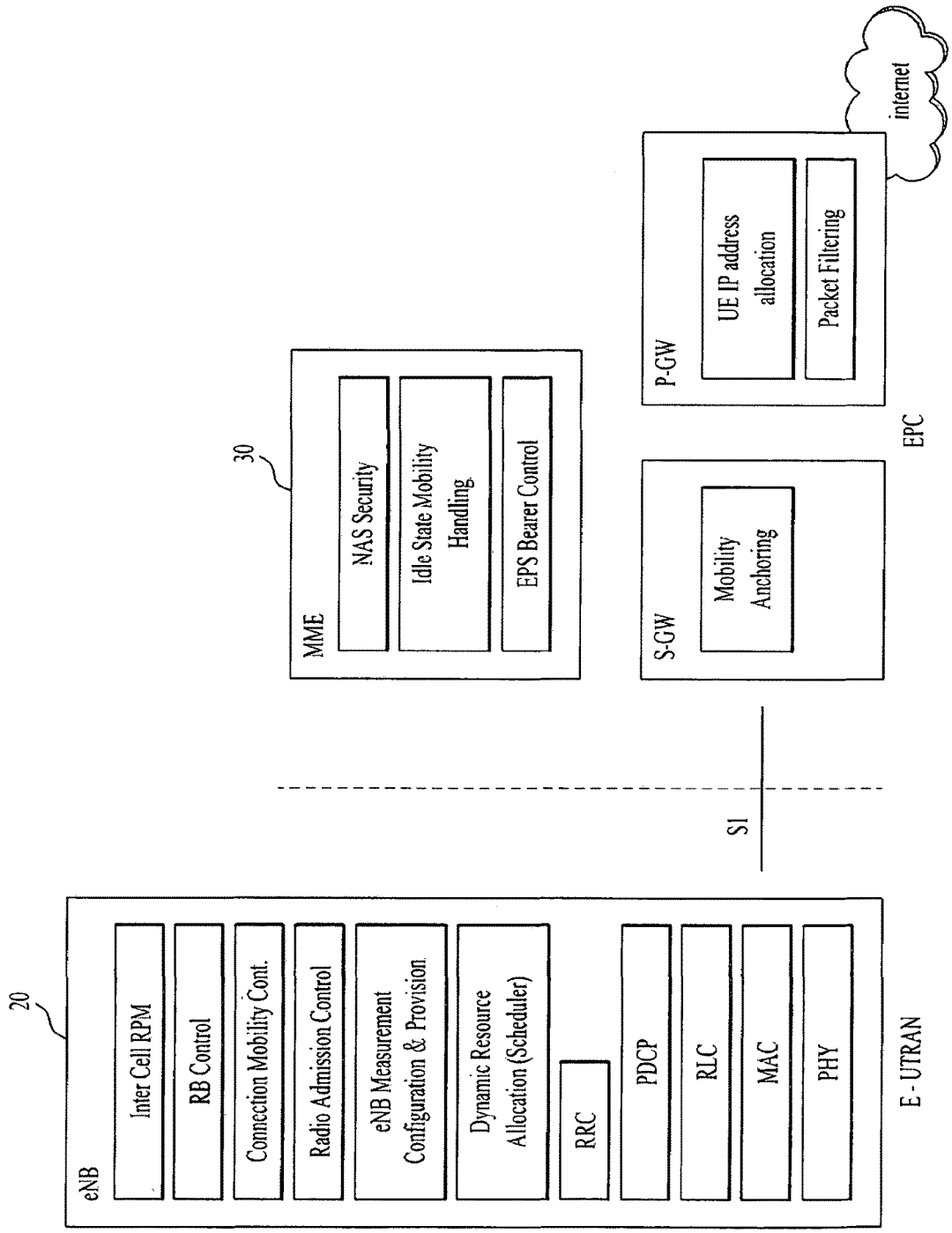
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
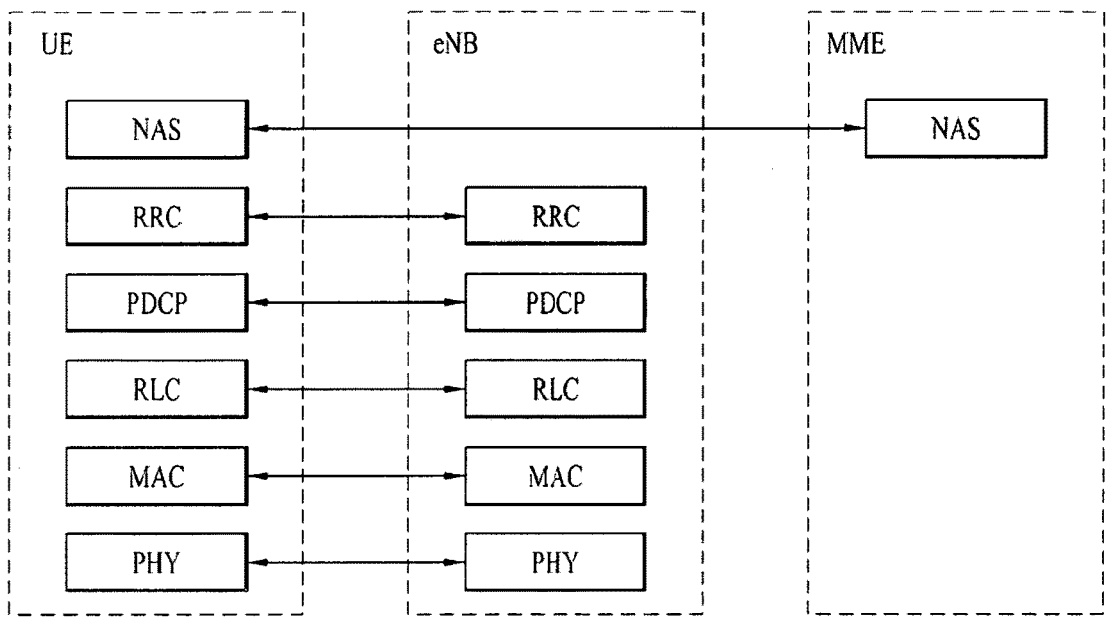
FIG. 3 is a diagram showing a control plane and a user plane of a radio interface protocol between a UE and an E-UTRAN based on a 3rd generation partnership project (3GPP) radio access network standard.
Figure 3:
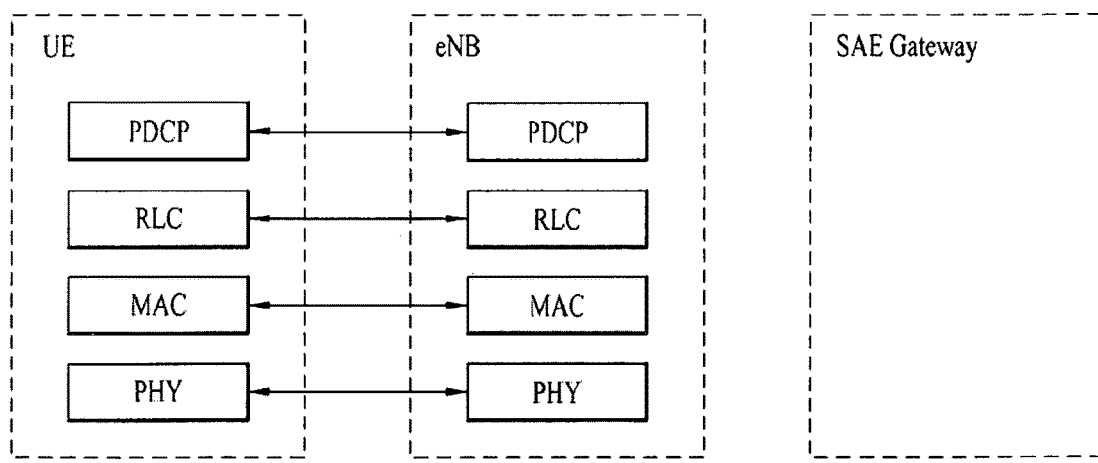

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth. A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
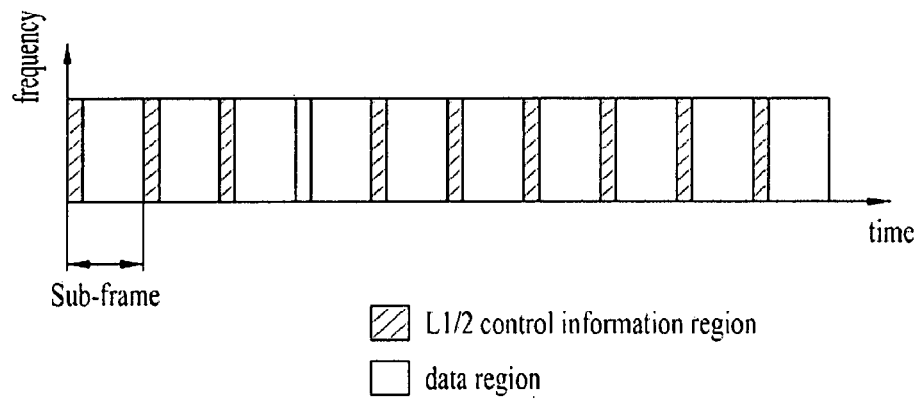
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
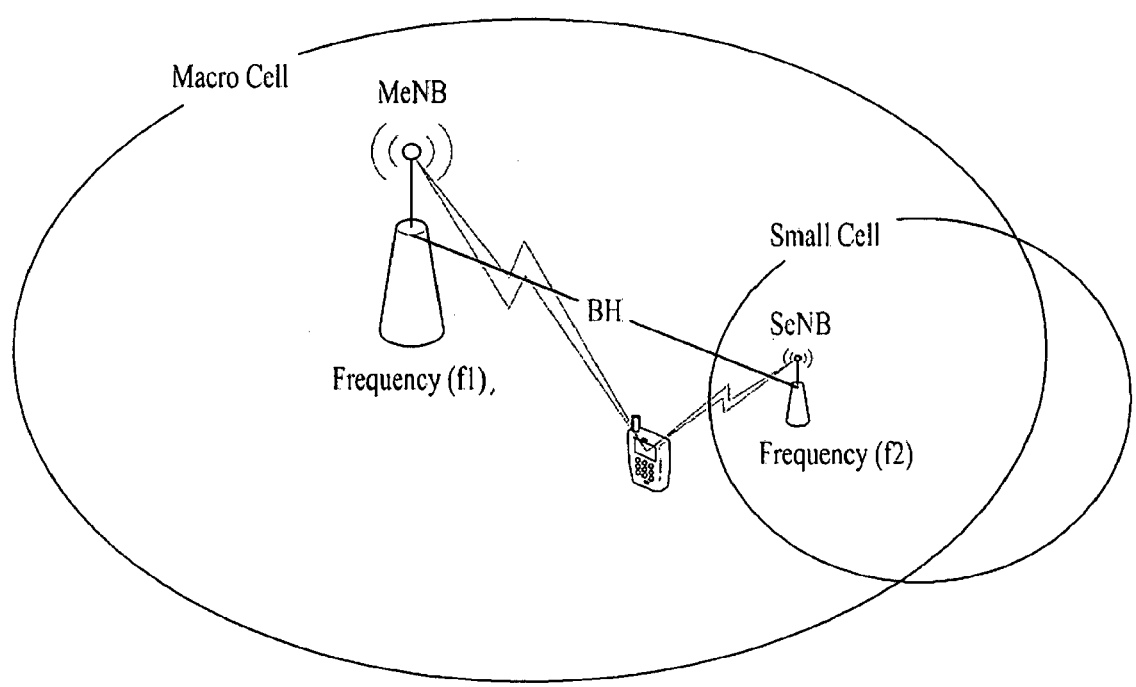
FIG. 5 is a conceptual diagram for dual connectivity between a macro cell and a small cell.

FIG. 5 is a conceptual diagram for dual connectivity between a macro cell and a small cell.

In the next system of LTE-A, a plurality of small cells (e.g., micro cell) may be present in a big cell (e.g. macro cell) having larger coverage than the small cells for optimization of data traffic, etc. For example, a macro cell and a micro cell may be combined for one user equipment (e.g. the dual connectivity). If the macro cell is used for managing mobility of the UE mainly (e.g. PCell) and the micro cell is used for boosting throughput mainly in this situation (e.g. SCell), the plurality of cells combined to the UE have different coverage each other. And each of cells can be managed by each of base stations. The base stations may be geographically separated (inter-site CA).

The dual connectivity means that the UE can be connected to both the macro cell and the small cell at the same time. With dual connectivity, some of the data radio bearers (DRBs) can be offloaded to the small cell to provide high throughput while keeping scheduling radio bearers (SRBs) or other DRBs in the macro cell to reduce the handover possibility. The macro cell is operated by MeNB (Macro cell eNB) via the frequency of f1, and the small cell is operated by SeNB (Small cell eNB) via the frequency of f2. The frequency f1 and f2 may be equal. The backhaul interface (BH) between MeNB and SeNB is non-ideal, which means that there is considerable delay in the backhaul and therefore the centralized scheduling in one node is not possible.

To benefit from the dual connectivity, the best-effort traffic which is delay tolerant is offloaded to small cell while the other traffic, e.g. SRBs or real-time traffic, is still serviced by the macro cell.

Figure 6:
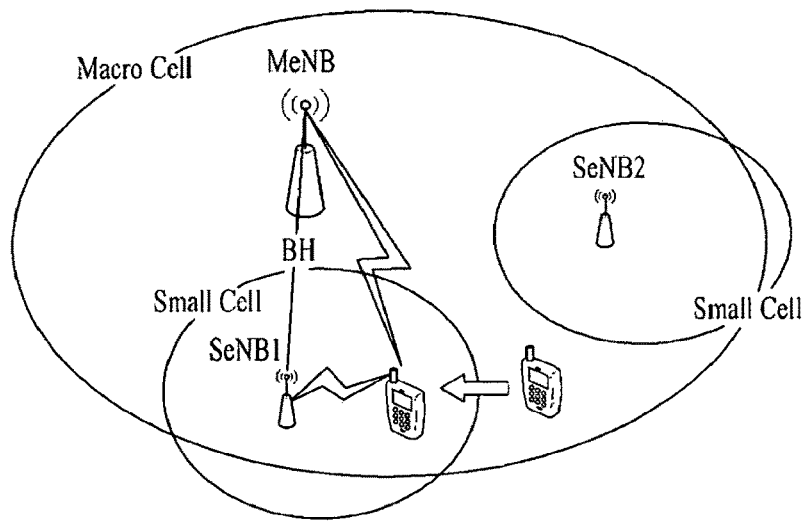
FIG. 6 is a conceptual diagram for cell changing in a dual connectivity system.
Figure 6:
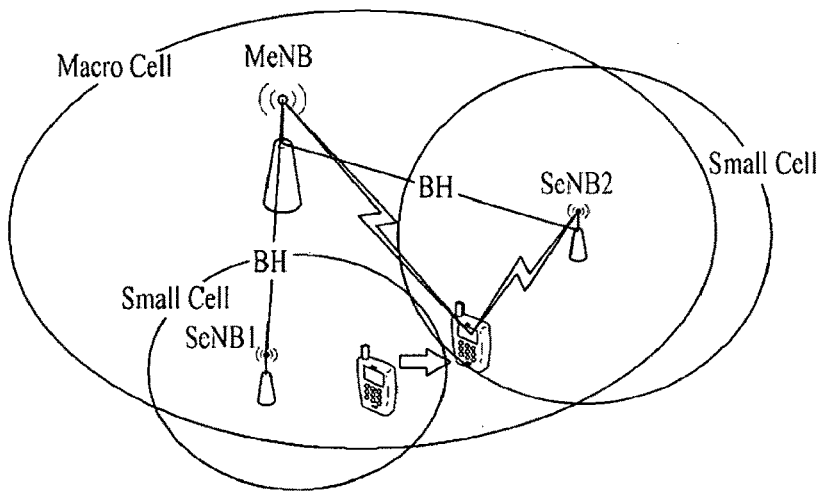
Figure 6:
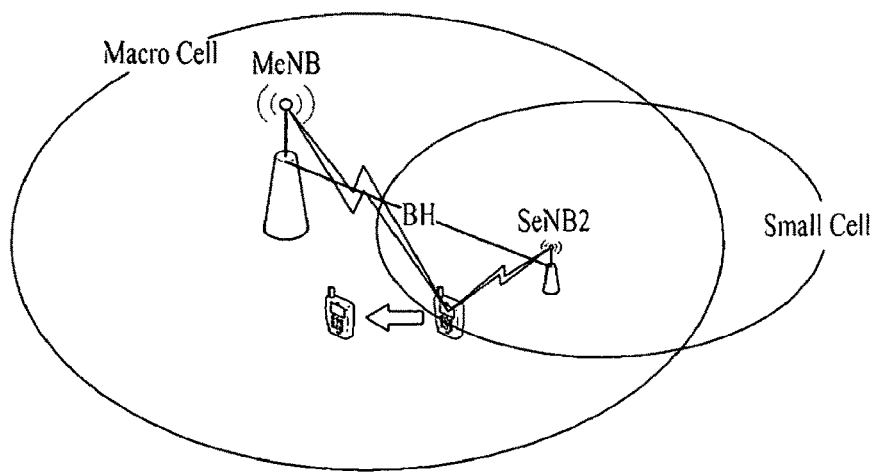

FIG. 6 is a conceptual diagram for performing a cell change procedure in a dual connectivity system.

The UE performs cell change procedure in RLC and PDCP entities when a cell is added, changed, or removed. More specially, when a certain radio bearer supporting the cell is added, changed, or removed, the UE performs the cell change procedure.

In the dual connectivity system between a macro cell and a small cell, when the small cell is added, changed, or removed, the UE performs small cell change (SCC) procedure in RLC and PDCP entities being communicating with a macro (or master) base station (MeNB). The small cell (e.g., a pico-cell, a femto-cell, etc.) can be a cell having a smaller coverage than coverage of the serving cell (e.g. macro cell).

The MeNB is one of base stations on the macro cell coverage and serves the macro cell coverage. The MeNB may be the eNB which terminates at least S1-MME (S1 for the control plane). The macro cell may be one of the macro cell groups being a group of serving cells associated with the MeNB, comprising of the PCell and optionally one or more SCells.

The SeNB is one of base stations on the small cell coverage and serves the small cell coverage. The SeNB may be the eNB that is providing additional radio resources for the UE but is not the MeNB. The small cell may be one of the small cell groups being a group of serving cells associated with the SeNB comprising of the special SCell and optionally one or more SCells. The coverage of macro cell and the coverage of small cell have an area overlapping each other.

When the UE performs the SCC procedure, the radio bearer whose all entities of the network may reside on a small cell or only for the radio bearer whose RLC/MAC/PHY (or only RLC entity) of the network may be moved from the MeNB to the SeNB, from a SeNB 1 to another SeNB 2, or from the SeNB to the MeNB. The PDCP entity may reside on a changed cell (split bearer structure).

As shown in FIG. 6, in case of (a), when the UE connected to the MeNB moves to the area under the SeNB1, some of the DRBs, e.g. BE-DRB (Best Effort-DRB), can be offloaded to the SeNB1. In this manner, the RLC/MAC/PHY of the BE-DRB is changed from the MeNB to the SeNB1 while the PDCP entity is still maintained in the MeNB.

In case of (b), when the UE connected to the MeNB moves from the area under the SeNB1 to the area under the SeNB2, the BE-DRB served by the SeNB 1 is moved to the SeNB2. In this manner, the RLC/MAC/PHY of the BE-DRB is changed from the SeNB1 to the SeNB2 while the PDCP entity is still maintained in the MeNB.

In case of (c), when the UE connected to the MeNB moves out of the area under the SeNB2, the BE-DRB served by the SeNB2 is moved to the MeNB. In this manner, the RLC/MAC/PHY of the BE-DRB is changed from the MeNB to the SeNB2 while the PDCP is still maintained in the MeNB.

Figure 7:
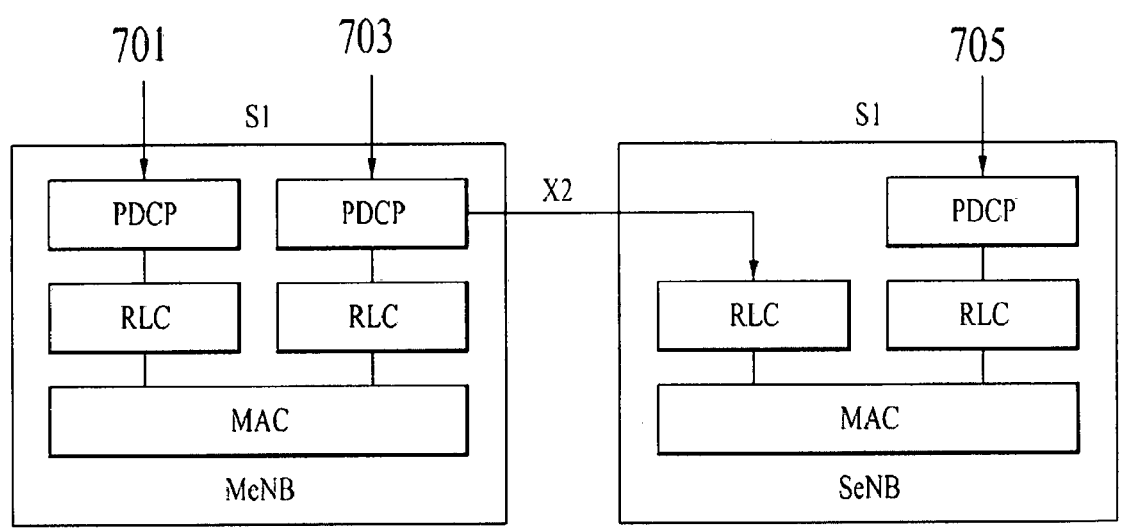
FIG. 7 is a conceptual diagram for radio protocol architecture for dual connectivity.

FIG. 7 is a conceptual diagram for radio protocol architecture for dual connectivity.

E-UTRAN of the present example can support dual connectivity (DC) operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity (DC) operation, the radio protocol architecture that a particular bearer uses depends on how the bearer is setup. Three alternatives exist, MCG (Master Cell Group) bearer (701), split bearer (703) and SCG (Secondary Cell Group) bearer (705). Those three alternatives are depicted on FIG. 7. The SRBs (Signaling Radio Bearers) are always of the MCG bearer and therefore only use the radio resources provided by the MeNB.

Specially, the dual connectivity (DC) operation can also be described as having at least one bearer configured to use radio resources provided by the SeNB.

Figure 8A:
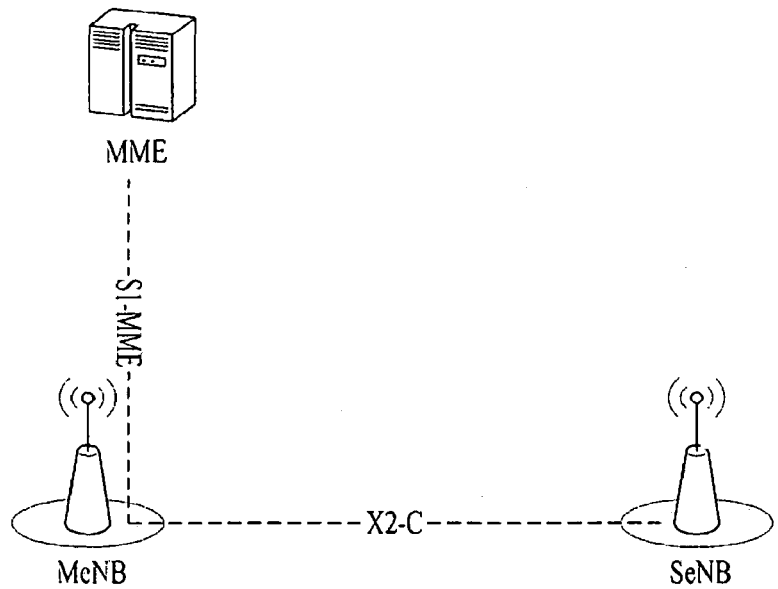
FIG. 8a is a conceptual diagram for C-Plane connectivity of base stations involved in dual connectivity.
Figure 8B:
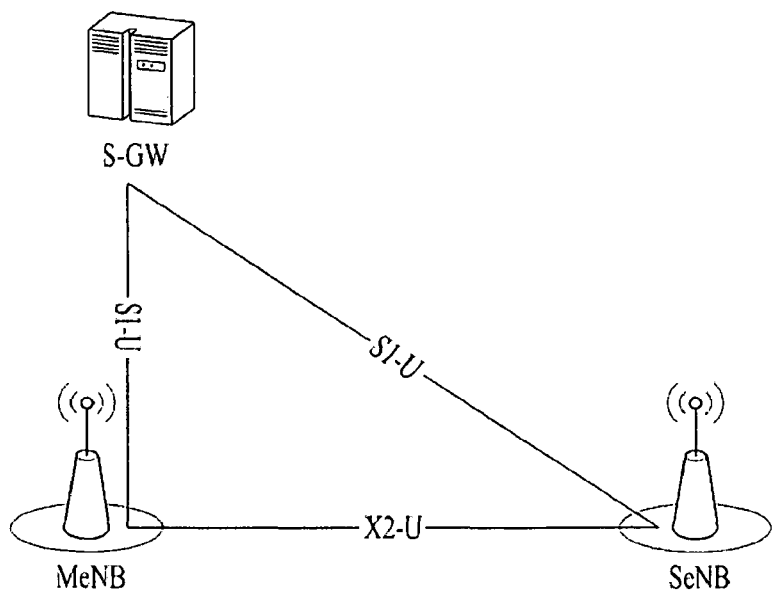
FIG. 8b is a conceptual diagram for U-Plane connectivity of base stations involved in dual connectivity.

FIG. 8a is a conceptual diagram for C-Plane connectivity of base stations involved in dual connectivity, and FIG. 8b is a conceptual diagram for U-Plane connectivity of base stations involved in dual connectivity.

FIG. 8a shows C-plane (Control Plane) connectivity of eNBs involved in dual connectivity for a certain UE: The MeNB is C-plane connected to the MME via S1-MME (S1 for the control plane), the MeNB and the SeNB are interconnected via X2-C(X2-Control plane).

As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell (Primary Cell) to some UEs while providing SCell(s) (Secondary Cells) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 8b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

So far, the UE has only one MAC entity. If one common MAC entity is used/shared between scheduling nodes to support multiple small cells, the scheduling node would have difficulties in managing/adjusting MAC entity according to its radio environment because the different scheduling nodes may be connected through non-ideal backhaul. For example, there may be a case that one scheduling node wants to reset the MAC entity of the UE while other scheduling nodes using the same MAC entity do not want to reset the MAC entity.

Figure 9:
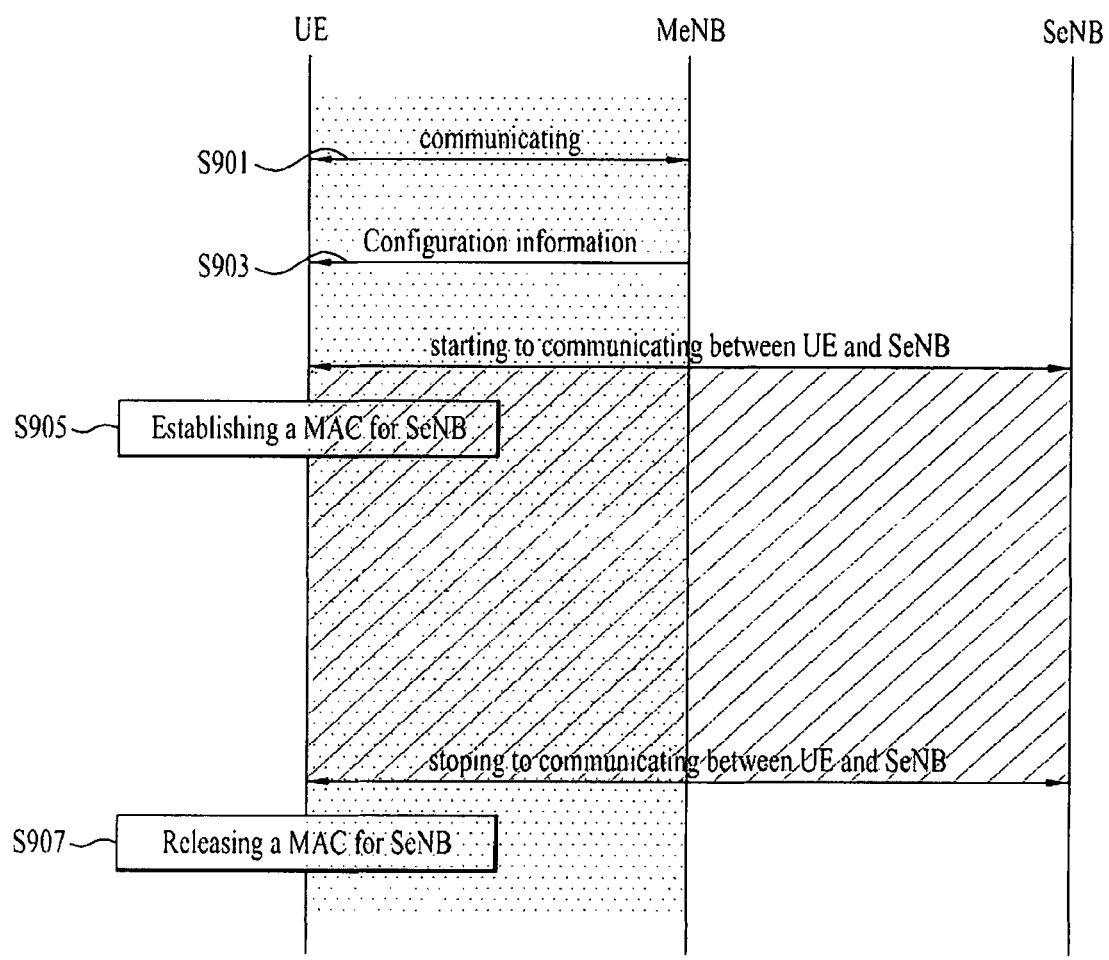
FIG. 9 is a conceptual diagram for establishing/releasing MAC entity in a cell change according to embodiments of the present invention.

FIG. 9 is a conceptual diagram for establishing/releasing MAC entity in a cell change according to embodiments of the present invention.

In this invention, the UE may maintain a MAC entity whose existence depends on the existence of small cell the UE is connected with. The MAC entity for small cell is called S-MAC, while the persistent MAC entity for macro cell is called M-MAC. The number of S-MAC entities the UE maintains at the same time may be equal to the number of small cells the UE is connected to. That is, there is one-to-one mapping between S-MAC entity and one of small cell, a group of small cells and bearer.

The UE can maintain multiple S-MAC entities if the UE is connected to multiple small cells. In this case, each S-MAC entity operates independently of other S-MAC entities. In the network side, the S-MAC entity is located in the Small Cell eNB (SeNB), while the M-MAC entity is located in the Macro Cell eNB (MeNB).

By default, the UE may maintain a MAC entity called M-MAC to communicate with a macro cell. Then, when the UE connects to a small cell in addition to the macro cell, the UE establishes a MAC entity called S-MAC to communicate with the small cell. The UE can release the S-MAC entity when disconnects to the small cell.

The UE may have multiple S-MAC that operate independently each other according to the number of the group of small cells, or bearers. In detail, the UE may establish S-MAC for small cell/the group of small cell/bearer and the UE may release the S-MAC when small cell/the group of small cell/bearer changes.

In this invention, the UE communicates with a first base station (BS) on a first type cell (S901), wherein the UE has a first MAC entity for the first type cell.

Desirably, the first BS may be the MeNB, the first type cell is one of the macro cells, and the first MAC entity for the first type cell may be the M-MAC entity.

The UE can receive configuration information including radio resource configuration of the second type cell to be added to or released from the UE (S903).

The MeNB or SeNB indicates to the UE that the UE shall establish or release the S-MAC entity. The configuration information may indicate that the a bearer or part of bearers for the UE shall be served by different small cell, and the configuration information may include i) Bearer identifier(s), ii) Small cell identifier(s), iii) Small cell group identifier(s), iv) S-MAC establishment/Re-configuration/release indication, and v) S-MAC establishment type.

The bearer identifier is an identifier of the RB whose RLC/MAC needs to be changed to small cell or small cell group. And the small cell identifier or small cell group identifier is an identifier of the target cell the RB needs to be changed to. Both macro cell and small cell are identified by this field. The RRC signaling message may further comprise RB (radio bearer) parameters that will be used in the small cell or small cell group.

Desirably, the second type cell is one of the small cells.

Desirably, the configuration information may be indicated through the first base station on a first type cell or a second base station on a second type cell. And the configuration information may be received through a RRC signaling message. The UE can receive the RRC signaling message directly from the SeNB as well as via MeNB from the SeNB.

Desirably, the RRC signaling message, called RBConfiguration message, may be used to request the UE to change the RB (radio bearer) configuration from MeNB to SeNB (for small cell addition case), from SeNB to another SeNB (for small cell change case), or from SeNB to MeNB (for small cell removal case).

For example, when the UE receives the RRC signaling message from the MeNB or SeNB, the UE may perform S-MAC establishment/re-configuration/release. Then, the bearers indicated by bearer identifier are served by a new/different small cell.

When the UE starts to communicate with a second BS while maintaining communication with the first BS, the UE may establish a second MAC entity for a second type cell (S905).

Desirably, the second MAC entity for a second type cell may be the S-MAC, the second BS may be the SeNB, and the second type cell may be one of the small cells.

Desirably, when the second type cell of the second BS is added to the UE, the UE may start to communicate with the second BS or, when a radio bearer is established on the second type cell of the second BS, the UE may start to communicate with the second BS.

When the UE stops to communicate with a second BS while maintaining communication with the first BS, the UE may release a second MAC entity for a second type cell (S907).

Desirably, when the second type cell of the second BS is removed from the UE, the UE may stop to communicate with the second BS, and when only one of radio bearers in the second type cell of the second BS releases, the UE may stop to communicate with the second BS.

Regarding the invention, when the MeNB or SeNB sends the configuration information indicating that "the target cell is a small cell" via the RRC signaling message, the UE may check the target cell identifier, and the UE may move the RB from macro cell to small cell. For the indicated RB, the UE shall perform the following behavior: i) Remove RLC for the macro cell, ii) Establish RLC for the small cell, iii) Establish S-MAC for the small cell if it does not exist. Otherwise, use already existing S-MAC for the small cell, and iv) Map the existing PDCP to RLC/S-MAC for the small cell.

When the MeNB or SeNB sends the configuration information indicating that "the target cell is macro cell" via the RRC signaling message, the UE may check the target cell identifier, and the UE may move the RB from small cell to macro cell. For the indicated RB, the UE shall perform the following behavior: i) Remove RLC for the small cell, ii) Remove S-MAC for the small cell if there are no RBs remaining in the small cell, iii) Establish RLC for the macro cell, and iv) Map the existing PDCP to RLC/M-MAC for the macro cell.

When the MeNB or SeNB sends the configuration information indicating that "the target cell is another small cell" via the RRC signaling message, the UE may check the target cell identifier, and the UE may move the RB from small cell to another small cell. For the indicated RB, the UE shall perform the following behavior: i) Remove RLC for the old small cell, ii) Remove S-MAC for the old small cell if there are no RBs remaining in the old small cell, iii) Establish RLC for the new small cell, iv) Establish S-MAC for the new small cell if it does not exist. Otherwise, use already existing S-MAC for the new small cell, v) Map the existing PDCP to RLC/S-MAC for the new small cell.

Rather than S-MAC removal and establishment, it is possible to apply the S-MAC reconfiguration at the small cell change. In this case, the UE resets the S-MAC and apply the parameters that will be used in the new small cell.

Figure 10A:
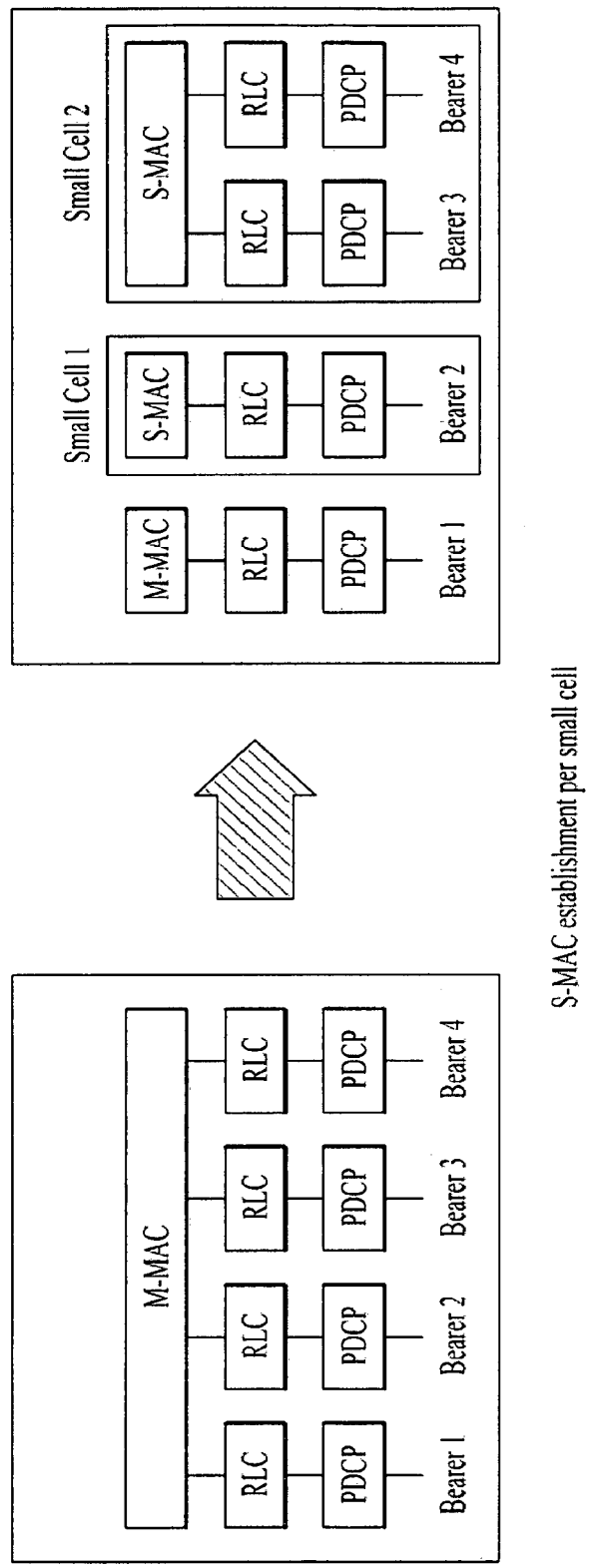
FIGS. 10a, 10b and 10c are conceptual diagrams for establishing MAC entity in a cell change according to embodiments of the present invention.
Figure 10B:
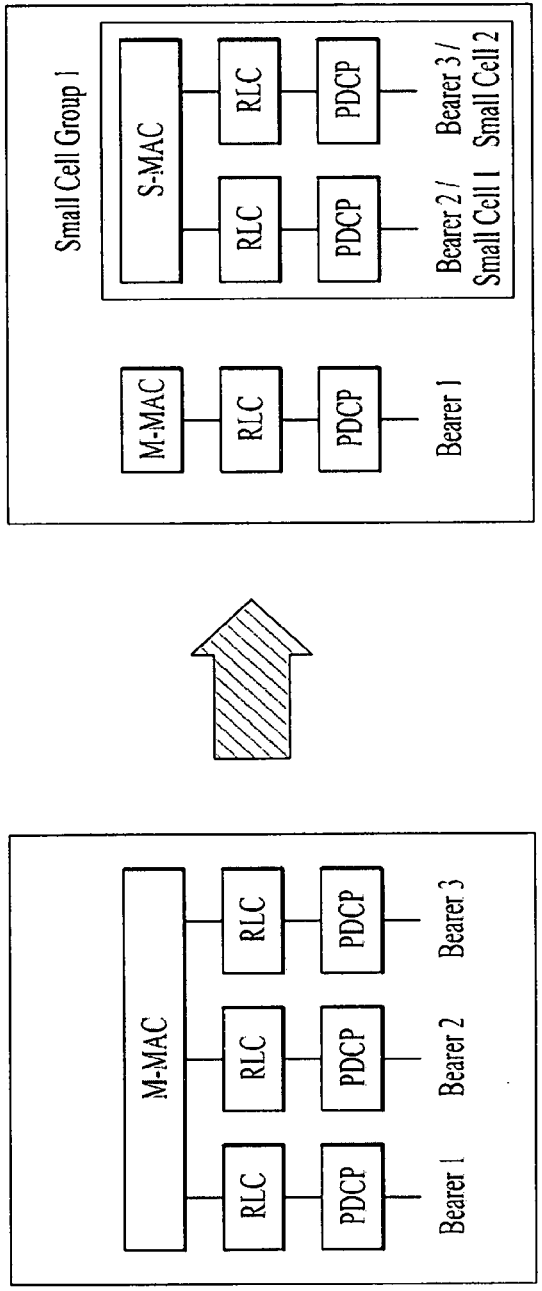

FIGS. 10a, 10b, 10b are conceptual diagrams for establishing MAC entity in a cell change according to embodiments of the present invention.

The UE can receive the RRC signaling message with or without S-MAC establishment indication from the MeNB or SeNB, when a UE is configured with a new small cell group.

When the UE receives the RRC signaling message without the S-MAC establishment indication, if it includes a small cell identifier or a small cell group identifier without S-MAC establishment indication, and if they are not being used at the time of reception of RRC signaling message, the UE may consider that a new small cell or a new small cell group is added to the UE, and perform S-MAC establishment.

When the UE performs S-MAC establishment, a bearer or part of bearers indicated by RRC signaling message shall be served by the newly added small cell. This is realized by that the bearer or part of bearers indicated by the RRC signaling is mapped to the S-MAC for a new small cell instead of the M-MAC.

There are three types of S-MAC establishment, i.e., S-MAC establishment 'per small cell', 'per group of small cells', and 'per bearer'. The S-MAC establishment type can be explicitly indicated by using the RRC signaling message or pre-determined between the UE and the MeNB/SeNB.

FIG. 10a is a conceptual diagram for establishing MAC entity per small cell in a cell change according to embodiments of the present invention.

If the S-MAC establishment type is 'per small cell', the UE may establish the S-MAC per small cell. The UE may establish equal number of the S-MACs as the number of the small cells. The bearers indicated by the bearer identifier are mapped to the corresponding S-MAC of the small cell instead of M-MAC. At least one bearer served by one small cell is mapped to one common S-MAC of the small cell.

When the UE performs this type of S-MAC establishment, the UE may establish one common S-MAC for the new small cell indicated by the small cell identifier of the RRC signaling message, and the bearer(s) indicated by the RRC signaling message are mapped to the common S-MAC of the small cell.

FIG. 10b is a conceptual diagram for establishing MAC entity per small cell group in a cell change according to embodiments of the present invention. If the S-MAC establishment type is 'per group of small cells', the UE may establish the S-MAC per group of small cells. The group of small cells may include at least one small cell. Within the same group of small cells, the UE may establish one common S-MAC. All the bearers served by the small cells belonging to the group of small cells are mapped to the common S-MAC of the small cell group. In this type of S-MAC establishment, the UE may establish equal number of the S-MACs as the number of the group of small cells.

When the UE performs this type of S-MAC establishment, the bearers indicated by the RRC signaling message are mapped to the common S-MAC of the small cell group indicated by the small cell group identifier.

Figure 10C:
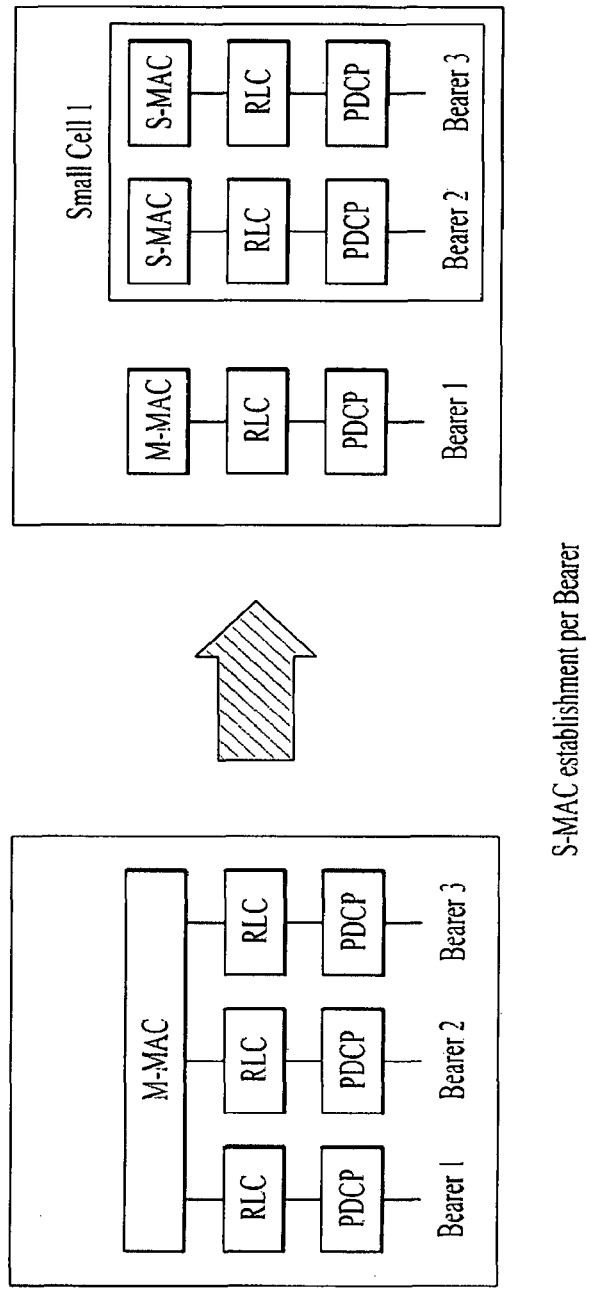

FIG. 10c is a conceptual diagram for establishing MAC entity per bearer in a cell change according to embodiments of the present invention.

If the S-MAC establishment type is 'per bearer', the UE may establish the S-MAC per bearer. The number of S-MACs is equal to the number of bearers. In this type of S-MAC establishment, each bearer may be mapped to the corresponding S-MAC of the small cell even though the bearers are served by the same small cell.

When the UE performs this type of S-MAC establishment, the bearers indicated by the RRC signaling message may be mapped to the separate S-MAC of the small cell indicated by the small cell identifier.

Figure 11:
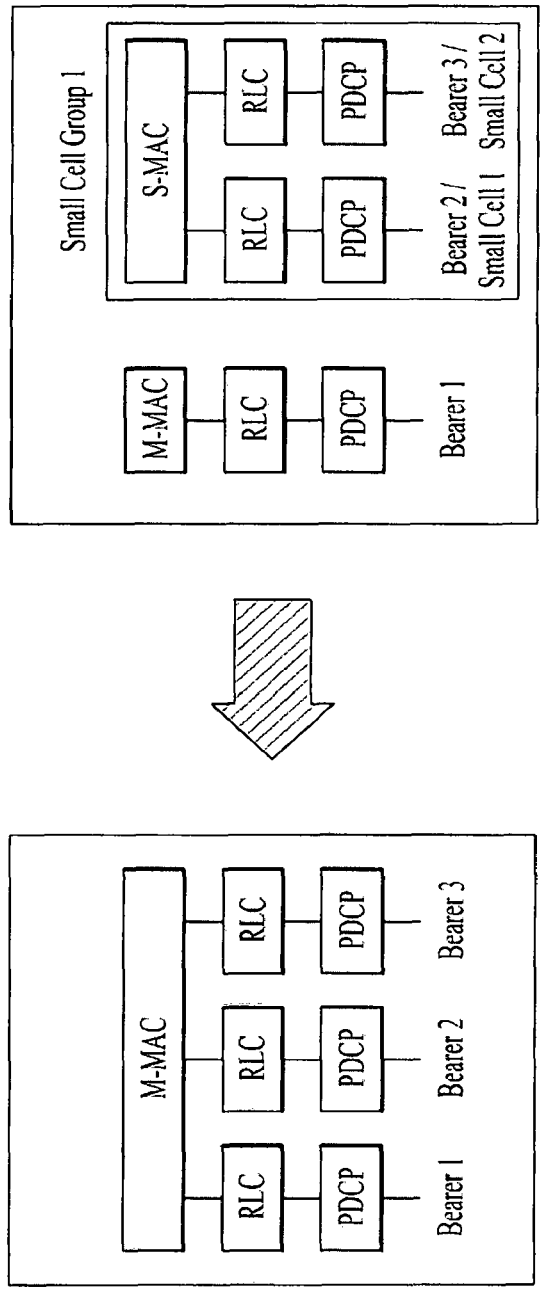
FIG. 11 is a conceptual diagram for releasing MAC entity in a cell change according to embodiments of the present invention.

FIG. 11 is a conceptual diagram for releasing MAC entity in a cell change according to embodiments of the present invention.

When the small cell or small cell group is removed, the UE may receive an S-MAC release indication by the RRC signaling message from the MeNB or the SeNB. When the UE receives the RRC signaling message, the UE may perform S-MAC release regarding the following S-MAC.

The S-MAC mapped to the bearer, small cell, or group of small cells may be indicated by the bearer identifier, the small cell identifier or the group of small cell identifier. And the S-MAC of small cell or group of small cells that includes the bearer may be indicated by the bearer identifier.

When the UE releases S-MAC(s) of the removed small cell or the removed small cell group, the UE may delete/discard all S-MACs related to the small cell, small cell group, or bearers indicated by the small cell identifier, small cell group identifier, or bearer identifier in the RRC signaling message, and the bearers mapped to the existing S-MAC(s), which is to be released, may be re-mapped to the M-MAC and served by the macro cell.

Figure 12:
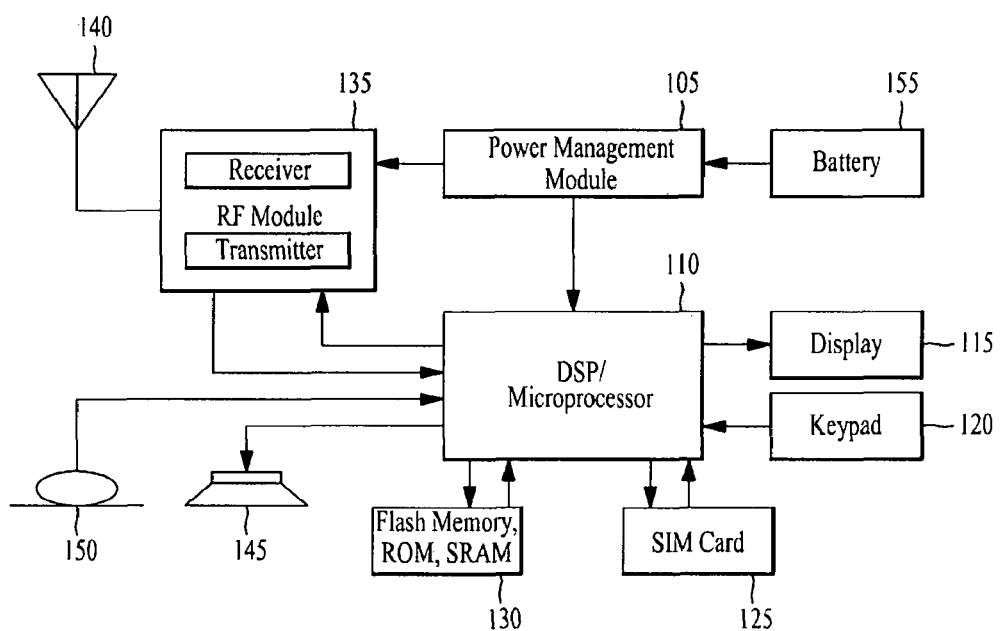
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system comprising a master base station (BS) and a secondary BS, the UE configured with a first MAC entity for a master cell group (MCG) associated with the master BS, the method comprising:
 receiving, from the master BS, a first Radio Resource Control (RRC) message via a serving cell of the MCG for configuration of a new secondary cell group (SCG) associated with the secondary BS,
 configuring, by the UE, a second MAC entity for the new SCG, according to the first RRC message, in addition to the previously configured first MAC entity, when a second MAC entity is not already configured for the UE,
 receiving, from the master BS, a second RRC message for addition of a new SCG cell to the SCG;
 adding, by the UE, the new SCG cell to the SCG according to the second RRC message, wherein the second MAC entity is commonly configured for one or more secondary cells, including the new SCG cell, belonging to the SCG;
 receiving, by the UE from the master BS, a third RRC message for removal of the SCG;
 releasing, by the UE, the second MAC entity for the SCG according to the third RRC message; and remapping a bearer to the first MAC entity, previously mapped to the second MAC entity, when releasing the second MAC entity.

2. A user equipment (UE) in a wireless communication system comprising a master base station (BS) and a secondary BS, the UE configured with a first MAC entity for a master cell group (MCG) associated with the master BS, the UE comprising:

a transmitter and a receiver; and a processor, operatively coupled to the transmitter and the receiver, configured to:

control the receiver to receive, from the master BS, a first Radio Resource Control (RRC) message via a serving cell of the MCG, configure a new secondary cell group (SCG), associated with the secondary BS, according to the RRC message, configure a second MAC entity for the new SCG, according to the first RRC message, in addition to the previously established first MAC entity, when a second MAC entity is not already configured for the UE, control the receiver to receive, from the master BS, a second RRC message for addition of a new SCG cell to the SCG;

add the new SCG cell to the SCG according to the second RRC message, wherein the second MAC entity is commonly configured for one or more secondary cells, including the new SCG cell, belonging to the SCG;

control the receiver to receive, from the master BS, a third RRC message, remove the SCG and release the second MAC entity based on the third RRC message; and remap a bearer to the first MAC entity, previously mapped to the second MAC entity, when the processor releases the second MAC entity.

\* \* \* \* \*